Sept. 2, 1947.  J. E. BEVINS  2,426,663
METHOD OF CHARGING TEMPERATURE RESPONSIVE SYSTEMS
Filed June 7, 1943  2 Sheets-Sheet 2

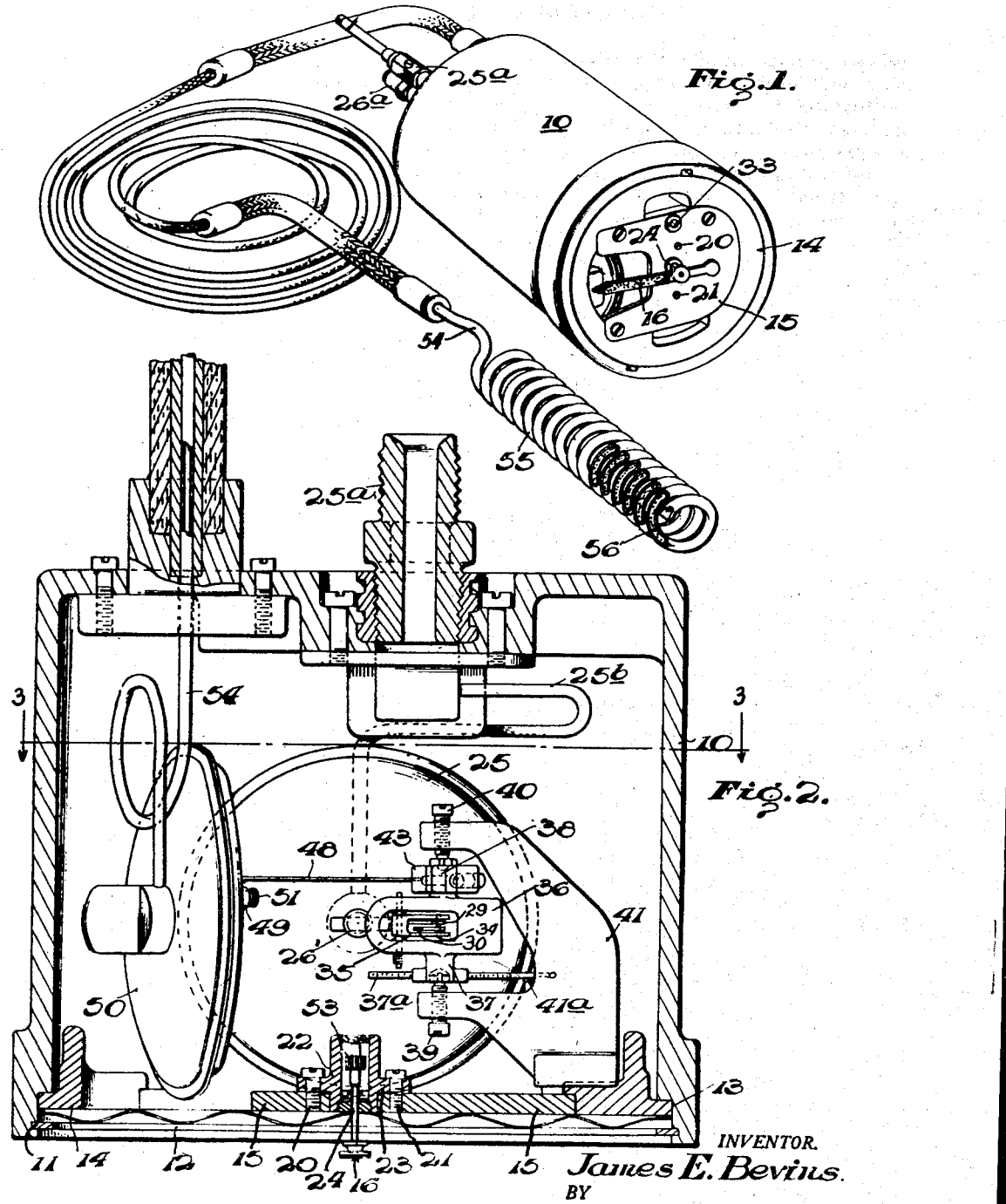

INVENTOR.
James E. Bevins
BY Herbert M. Birch
Attorney

Patented Sept. 2, 1947

2,426,663

UNITED STATES PATENT OFFICE 2,426,663

METHOD OF CHARGING TEMPERATURE RESPONSIVE SYSTEMS

James E. Bevins, Hackensack, N. J., assignor to Bendix Aviation Corporation, Bendix, N. J., a corporation of Delaware Application June 7, 1943, Serial No. 489,983

2 Claims. (Cl. 226—19)

The present invention relates to a method of charging temperature responsive systems, and more particularly to an air thermometer used with airspeed indicators.

True airspeed indicators are designed to indicate relative velocity between the air stream and the craft at any altitude and temperature likely to be encountered in normal service. Unless the instrument includes a compensator means responsive to the different air densities present at different altitudes and temperatures, the pilot must correct the indicated airspeed reading in accordance with each variation in altitude and temperature, as the instrument will not read accurately with respect to zero, except for the originally calibrated air density from a given relative altitude and temperature.

To obtain true airspeed at all normally experienced altitudes and temperatures, prior devices use vapor tension or liquid-filled thermometers requiring two or more Bourdon tubes or diaphragms to compensate for the pressures created from sudden air density variations. With the air thermometer provided by the present invention, the pressures created by such changes in air density are relatively low, as compared with pressures created in the above prior devices, making it satisfactory to use one pressure responsive member to give both temperature and altitude correction (density correction).

Accordingly, an object of the invention is to provide a low pressure thermometer adapted to structurally simplify prior art compensating devices of the class above referred to.

Another object of invention is to provide an improved air thermometer containing a highly active gas adsorption medium.

Another object is to provide a compensating Bourdon tube or diaphragm with a gaseous medium and material having adsorbing and diffusing qualities responsive to temperature changes, and a method of charging the compensating diaphragm with the gaseous medium.

The above and further objects and advantages of the invention will appear more fully hereinafter from a consideration of the detailed description which follows, taken together with the accompanying drawings wherein an airspeed indicator modified by a compensating temperature responsive diaphragm is illustrated. It is to be expressly understood that the drawings are for purposes of illustration and description only and are not designed as a definition of the limits of the invention.

In the drawings, wherein like reference characters refer to like parts throughout the several views:

Figure 1 is a perspective view of the accessory unit.

Figure 2 is a longitudinal cross section view of the casing with the elements inside shown in elevation.

Figure 3:
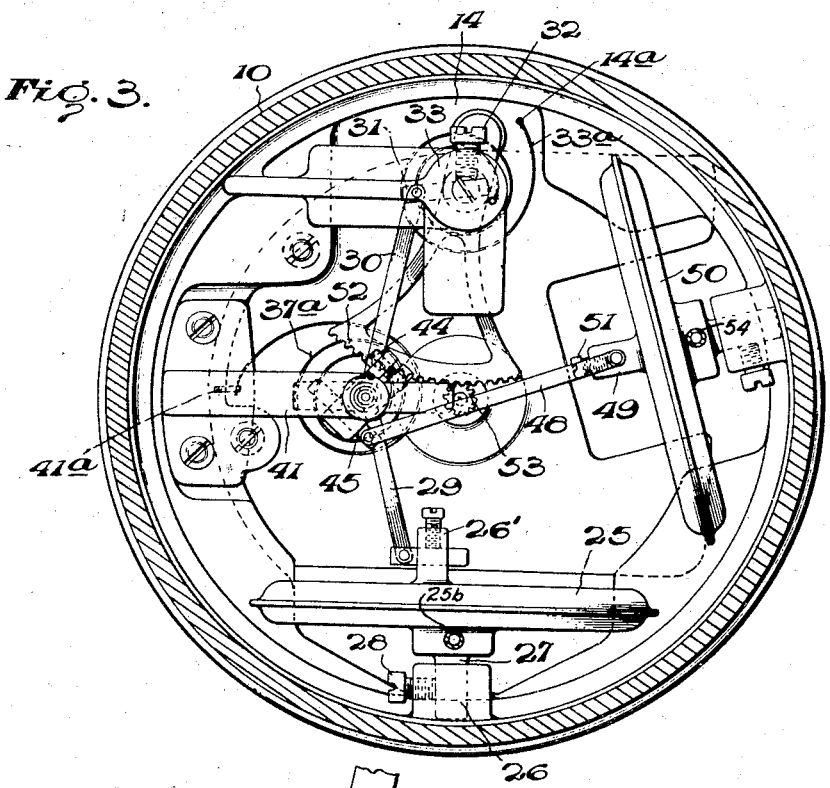
Figure 3 is a transverse view partly in elevation of the casing and elements housed therein, a section being taken as shown at line 3—3 in Figure 2.

Referring in detail to the drawings, 10 is a casing open at the front provided with an annular groove 11 to receive a snap ring 12 and with an annular shoulder 13 to support ring or frame 14.

The surface of frame 14 is recessed to receive a centrally perforated plate 15 to which is secured a bushing 22 having a coupling flange 23, coupled flush against the under side of plate 15 by bolts 20 and 21. Extending from within the casing 10, through bushing 22, is an indicator hand spindle 24.

Spindle 24 has the usual indicator hand 16 on the outer extremity and is in operative mechanical connection at the other end, inside casing 10, to diaphragm 25 suspended from apertured lug 26 on shaft 27. Shaft 27 is held in lug 26 by set screw 28, see Figure 3.

Diaphragm 25 is actuated by differential in static and dynamic pressure received through static pressure connection 26a and dynamic pressure connection 25a coupled to capillary tube 25b, see Figures 2 and 3.

Adjustably pivoted to upstanding lug 26' of diaphragm 25 is a link 29, of a toggle link connection comprising link 29 and link 30. Link 30 is secured to a yoke 31, adjustably secured by a set screw 32 to an oscillator bar 33, suitably journalled in plate 15. Also secured to bar 33 is the inner end of back-lash take-up hair spring 33a, with the outer end secured to pin 14a on frame 14. At the opposite end, link 30 is associated with a common pivot 34 in yoke 35, see Figure 2, eccentrically pivoted with rocker bracket 36 having lugs 37 and 38, pivoted between axial screw pins 39 and 40 threaded through lugs in frame 41.

Figure 4:
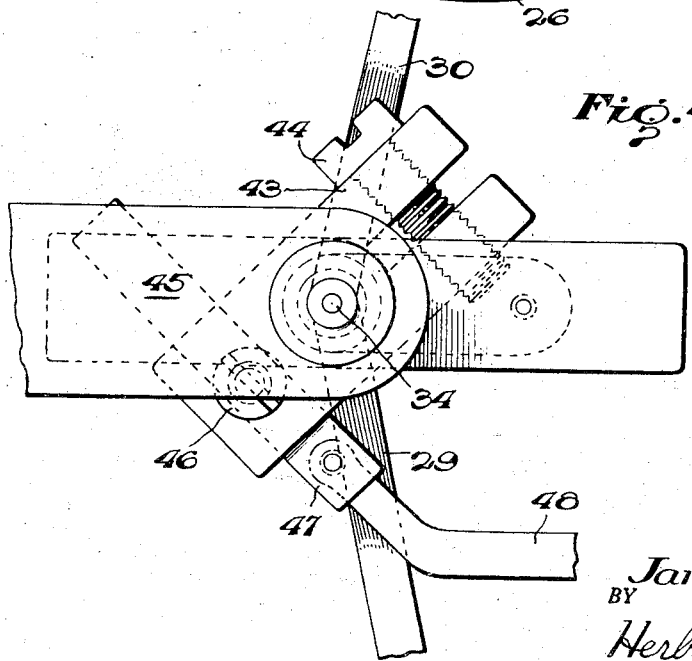
Figure 4 is an enlarged elevational view of one form of mechanical compensator linkage.

Rocker bracket lug 37 has associated therewith a hair spring 37a secured at the outer end to pin 41a and lug 38 has clamped thereto an elongated split lug 43 clamped thereto by screw 44. Split lug 43 is apertured at the opposite end (see Figure 4) to receive elongated bar 45. Bar 45 is adjustably secured in the split lug aperture by set screw 46, so that an end protrudes therefrom at 47 to which is pivoted link 48.

Link 48 is adjustably secured to inwardly extending lug 49 of diaphragm 50 by set screw 51 and any back-lash in link 48 is taken out by hair spring 37a, see Figure 3.

Secured to oscillator bar 33 is a segment gear 52 so positioned as to mesh with a pinion 53 of indicator spindle 24, that carries indicator hand 16.

The above described linkage is generally referred to herein as any suitable differential linkage.

As shown in Figures 1 and 2, compensator diaphragm 50 is connected to a capillary tube 54, connected in turn to a bulb or coil 55, which is subject to the temperature that is to be measured. The coil or bulb 55 is completely filled with gas adsorption medium, such as activated coconut charcoal granules 56, before it is soldered to the capillary tubing 54. The system is then completely evacuated with the bulb 55 at approximately 150° C. It is then charged with any suitable dry gas, as carbon dioxide ($CO_2$).

During the filling operation, bulb 55 is gradually cooled to the lowest temperature that it is expected to encounter in service, while the filling gas is still connected to the system. The bulb 55 is next sealed and the gas is in contact with the diaphragm 50 and the activated coconut charcoal in bulb 55 for the purpose referred to under the following heading.

Operation

Assuming the entire device to be installed in an aircraft, the proximate cause of compensation for varying air densities is the reaction of charcoal contained in bulb 55 with the $CO_2$ gas. As the charcoal is cooled, it adsorbs the gas and causes a partial vacuum in the system. When it is heated, the opposite effect is present and causes a pressure to expand the diaphragm 50. This expansion and contraction of the sensitive element 50 is transmitted through the differential linkage to give correct compensation of a True Airspeed Indicator, or to a hand and dial to indicate temperature. Link 48 when displaced from a rest position has the effect of proportionally varying the distance between the pivot points of links 29 and 30 at the diaphragm 25 and yoke 31 on oscillator bar 33 as long as the pin 34 is not in line with the axis of pins 39 and 40, which alignment occurs only when the position of diaphragm 25 indicates zero velocity. This arrangement does not affect the "zero position" of pointer 16, but keeps the linkage set so that, when diaphragm 25 operates, a true indication from zero results.

The characteristics of the system can be controlled by making a larger or smaller bulb and putting in varying amounts of activated coconut charcoal.

Any other type activated carbon can be used to fill such a system, but coconut charcoal is satisfactory as it is most active for gas adsorption.

The herein described true airspeed indicator is claimed in my divisional application bearing Serial No. 612,196 for Airspeed Indicator, filed on August 23, 1945.

While only one embodiment of the invention has been illustrated and described, various changes and modifications, which will now appear to those skilled in the art, may be made without departing from the scope of the invention. Reference is therefore to be had to the appended claims for a definition of the limits of the invention.

What I claim is:

1. The method of charging a temperature responsive system including a pressure responsive member and a thermal bulb interconnected by a capillary tube comprising the following steps: filling the bulb with charcoal granules, evacuating air from the system while heating the bulb at a predetermined temperature, then filling the system with a dry gas at substantially sea-level pressure while gradually cooling to the lowest anticipated temperature to be encountered in service and then sealing the system.

2. The method of charging a temperature responsive system including a pressure responsive member and a thermal bulb interconnected by a capillary tube comprising the following steps: filling the bulb with charcoal granules, evacuating air from the system while heating the bulb at approximately 150 degrees centigrade, then filling the system with carbon dioxide gas at substantially sea-level pressure while gradually cooling to the lowest anticipated temperature to be encountered in service and then sealing the system.

JAMES E. BEVINS.

REFERENCES CITED

The following references are of record in the file of this patent:

UNITED STATES PATENTS

| Number | Name | Date |
|---|---|---|
| 1,272,554 | Steenbjerg | July 16, 1918 |
| 1,356,175 | Swift | Oct. 19, 1920 |
| 1,615,505 | Cornman et al. | Jan. 25, 1927 |
| 2,137,194 | Weber | Nov. 15, 1938 |
| 2,177,244 | Ciamberlini | Oct. 24, 1939 |
| 2,302,713 | Paulin | Nov. 24, 1942 |
| 436,045 | McElroy | Sept. 9, 1890 |
| 792,588 | Fulton | June 20, 1905 |
| 1,159,893 | Browne et al. | Nov. 9, 1915 |
| 2,221,633 | Dasher | Nov. 12, 1940 |
| 2,271,307 | Ray | Jan. 27, 1942 |
| 1,307,037 | Bristol | June 17, 1919 |